3,551,497
CATALYSIS OF THE EXCHANGE REACTION BETWEEN SECONDARY ALCOHOLS AND KETONES
Charles E. Wymore, Midland, Mich., assignor to The Dow Chemical Company, Midland, Mich., a corporation of Delaware
No Drawing. Filed Mar. 3, 1969, Ser. No. 804,009
Int. Cl. C07c 49/78
U.S. Cl. 260—592        11 Claims

ABSTRACT OF THE DISCLOSURE

Alumina has been found to be an excellent catalyst for the liquid phase exchange reaction between a saturated secondary alcohol and a saturated ketone wherein the ketone is reduced to the corresponding alcohol and the starting alcohol is oxidized to a ketone. The exchange reaction is conducted at a pressure sufficient to provide liquid reactants and preferably at a temperature between about 150 and 300° C.

BACKGROUND OF THE INVENTION

The reduction of an aldehyde or ketone to the corresponding alcohol by treatment with a lower alkanol containing dissolved aluminum alcoholate is known generally as the Meerwein-Ponndorf-Verley reduction.

Alumina has been reported to be a catalyst for the corresponding vapor phase reaction between saturated non-aromatic non-tertiary alcohols and unsaturated non-aromatic aldehydes or ketones. See Ballard et al., British Pat. No. 619,014.

Alumina has also been reported to be an inert carrier for an oxide catalyst in the vapor phase reaction between non-tertiary alcohols and alpha-methylidene aldehydes. See Ballard et al., U.S. Patent No. 2,767,221.

Similarly, alumina has been taught to be inert under a high pressure, high temperature reaction between methanol and a carbonyl-containing compound. See Andrews et al., U.S. Pat. No. 2,156,217.

SUMMARY OF THE INVENTION

It has now been found that alumina is an excellent catalyst for the liquid phase exchange reaction between a saturated secondary alcohol and a saturated ketone. Because of this discovery, many alcohols and ketones can now be synthesized by a simple process that involves an inexpensive catalyst. Moreover, the catalyst life is good and the catalyst can be regenerated by well-known techniques.

DETAILED DESCRIPTION

The exchange reaction of this invention occurs between substantially any saturated secondary alcohol and substantially any saturated ketone. The reaction is reversible and is as follows:

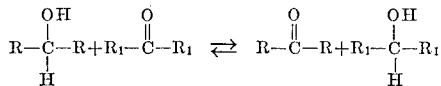

wherein each R and $R_1$ group is a hydrocarbon radical or a substituted hydrocarbon radical.

Typical alcohols and ketones useful in this invention are those defined in the above equation when each R independently and each $R_1$ independently is alkyl or phenyl, either unsubstituted or substituted with groups inert under the reaction conditions, e.g., halo, amino, cyano, alkyl, having up to about six carbon atoms or phenyl. Alicyclic ketones of 5–12 carbon atoms such as cyclopentanone, cyclohexanone, and methylcyclohexanone are similarly operable.

Thus, specific alcohols that are used as starting materials in this invention include the secondary alkanols, especially those having up to about twelve carbon atoms, e.g., isopropyl alcohol, sec-butyl alcohol, cyclopentanol, 3-methyl - cyclohexanol, 3-methyl-2-pentanol, 2-octanol, 5-ethyl - 2 - nonanol, 3 - cyano-2-butanol, and the like. Also included are aromatic alcohols, especially those having phenyl groups, e.g., $\alpha$-methylbenzyl alcohol, benzhydrol, p-chloro-$\alpha$-methyl-benzyl alcohol, m-amino-$\alpha$-methylbenzyl alcohol, and the like.

Specific ketones useful as starting materials include the dialkyl ketones, especially those having up to about twelve carbon atoms, e.g., dimethyl ketone, diethyl ketone, di-n-propyl ketone, di-n-butyl ketone, methyl ethyl ketone, di-isopropyl ketone-di-(2-chloroethyl) ketone and the like. Also included are the diphenyl ketones, e.g., benzophenone, p,p'-diaminobenzophenone and the like, and the alkyl phenyl ketones, e.g., acetophenone, 2'-chloroacetophenone, 4'-tert-butyl-2'-chloroacetophenone, 4'-bromoacetophenone, 2',5'-dichloroacetophenone, propiophenone, 4'-tertbutylacetophenone, butyrophenone, and the like.

Preferred ketones and alcohols include the alkyl phenyl ketones (wherein the alkyl group has up to about six carbon atoms), and their derivatives having one to two lower alkyl or halogen substituents on the aromatic ring, e.g., acetophenone, butyrophenone, 4' - chloroacetophenone, 3'-tert-butylacetophenone, 2',5' - dichloroacetophenone, 4'-tert-butyl-2'-chloroacetophenone, 2'-bromoacetophenone, and their isomers and mixtures thereof; the lower alkanols, e.g., isopropyl alcohol and sec-butyl alcohol.

In order to practice the invention, a secondary saturated alcohol is reacted by contact, in any convenient manner, with a saturated ketone while in the presence of a catalytic amount of alumina. Any significant amount of alumina is operable. After reaction, the desired products are separated from the reaction mixture by conventional techniques, e.g. fractional distillation. A preferred method is a continuous process wherein the reactants are premixed prior to passing in liquid form through a fixed bed of alumina.

The alumina that is useful as a catalyst in this invention is any activated alumina such as the various types which are commercially available from a number of sources. The catalysts can be acidic, neutral or basic, but generally, it is preferred to use a neutral or basic activated alumina. Of course, the alumina catalysts of this invention are well known to those skilled in the art and they can be synthesized by well-known processes, e.g., they can be prepared by crystallizing from aluminate solutions. The specific type of alumina used is not critical to the process herein described.

The molar ratio of reactants can vary widely depending upon the product which is desired. Typically, it is preferred to use an excess of lower alkanol (1–4 carbon atoms) in the reduction of an aromatic ketone to the alcohol. Molar ratios of alcohol to ketone of 3 to 1 or higher are preferred in this reaction. The preferred amount of alumina is typically from 0.5 to 10 percent by weight of the reaction mixture.

The temperature of the reaction can also vary, but generally it is between about 150 and 300° C. Typically, temperatures between about 175 and 250° C., and preferably between about 200° and 225° C., are used with good success.

The pressure at which the reaction is conducted is that pressure necessary to keep the reactants in the liquid phase. The autogenous pressure of the system will suffice. Although pressure will vary, depending upon the reactants and the process conditions, it is typically between about 100 and 800 p.s.i. An inert gas, e.g. nitrogen, can be used to pressurize the system if desired.

The ratio of alcohol to ketone used depends upon whether it is desired to reduce a ketone or perform the reverse reaction, that is, to oxidize an alcohol. The oxidation potential of the ketone-alcohol couple is also a major factor. Oxidation potentials are known, see H. Adkins et al., J. Am. Chem. Soc. 71, 3622 (1949), and can be used as a guide in selecting the proper ratio. If the desired reaction is to reduce a ketone, one can use a substance excess of a poor reducing alcohol such as cyclohexanol or one can accomplish the same objective by using less of a better reducing alcohol such as isopropanol.

If one is trying to oxidize an alcohol, an excess of the ketone would be used to shift the equilibrium.

EXAMPLES 1-3

In these experiments, 20 ml. of crude ar-chloroacetophenone, 60 ml. of isopropyl alcohol, and 3 grams of powdered activated alumina were combined in a 180 ml. stainless steel rocking reactor and the mixture was heated for 2 hours at 200° C. The mixture represented a 5.1 to 1 mole ratio of alcohol to total aromatics. The ar-chloroacetophenone was essentially a mixture of the ortho and para isomers containing about 34 percent of the corresponding chlorophenethyl alcohols. The aromatic fractions of the reaction products were analyzed by gas-liquid chromatography after removal of lights by distillation. Surface areas of the catalysts are given in square meters per gram.

| Example | Catalyst | Surface area | ClPEA [1], mole percent |
|---|---|---|---|
| 1 | 98% Al$_2$O$_3$ (alkaline) | 140-150 | 72 |
| 2 | 97% Al$_2$O$_3$ microspheres (approximately neutral) | 180-200 | 82 |
| 3 | 92% Al$_2$O$_3$-6% SiO$_2$ (slightly acidic) | 210-240 | 54 |

[1] ar-chloro-α-phenethyl alcohol.

EXAMPLES 4-8

The procedure of Examples 1-3 was repeated reacting ar-chloroacetophenone with isopropyl alcohol using one eighth inch activated alumina pellets as the alumina component and running at various temperatures and reaction times. The aluminas were slightly alkaline or about neutral with somewhat different surface areas as noted.

| Example | Catalyst | Time, hrs. | Temp., °C. | ClPEA, mole percent |
|---|---|---|---|---|
| 4 | Al$_2$O$_3$ (alkaline) 80-100 sq. m./g | 1.5 | 150 | 54.5 |
| 5 | do | 4 | 250 | 85 |
| 6 [1] | do | 4 | 250 | 29 |
| 7 | Al$_2$O$_3$ (approx. neutral) 180-200 sq. m./g | 2 | 200 | 42 |
| 8 | do | 4 | 250 | 2 40 |

[1] 20 ml. of isopropyl alcohol was used, a molar ration of 1.7 to 1 of total aromatics.
[2] 9.7% ethers also present.

EXAMPLE 9

Under conditions essentially as described in Examples 1-3, a mixture of 60 ml. isopropyl alcohol, 25 g. of 4'-bromoacetophenone, and 3 g. of powdered slightly alkaline activated alumina was heated for 3.5 hours at 250° C. to obtain an aromatic product containing p-bromo-α-phenethyl alcohol.

EXAMPLE 10

In the same manner, a mixture of 20 ml. α-phenethyl alcohol, 60 ml. of cyclohexananone, and 3 g. of a similar alumina powder was heated for 3 hours at 200° C. to obtain a mixture of equal proportions of acetophenone and the starting alcohol as the aromatic portion of the reaction product.

EXAMPLE 11

A continuous reactor consisting of an 18 inch by 0.56 inch I.D. stainless steel pipe fitted with a screen at the bottom end to support the catalyst and a thermowell extending down from the top was mounted in an electric furnace equipped with suitable temperature controls. A catalyst bed of 64.8 g. of the pelleted alumina used in Examples 4-6 was loaded into the reactor and with the reactor temperature maintained at about 210° C., the ar-chloroacetophenone-isopropyl alcohol feed was pumped into the bottom of the reactor tube at 4.1 ml./minute with a corresponding volume of effluent taken off at the top. The feed consisted of three volumes of isopropyl alcohol to one volume of crude chloroacetophenone. The latter contained 25.4 percent 2'-chloroacetophenone and 46.9 percent 4'-chloroacetophenone, the remainder being essentially a mixture of the corresponding chloro-α-phenethyl alcohols. During 103 hours of operation in this fashion, the aromatic fraction of the effluent product contained between 72 percent and 76 percent of ortho and para-chloro-α-phenethyl alcohols. As in the foregoing examples, the recovery of aromatics was essentially quantitative.

EXAMPLE 12

Using the general procedure described in Examples 1-3, a mixture of 60 ml. of isopropyl alcohol, 20 g. of benzophenone, and 3 g. of a slightly alkaline activated alumina was heated for two hours at 200° C. Examination of the reaction product disclosed that about 34 percent of the benzophenone had been converted to benzhydrol, with the remainder unreacted.

EXAMPLE 13

In the same way, a mixture of 60 ml. of isopropyl alcohol, 10 g. of 2',5'-dichloroacetophenone, and 3 g. of the same alumina was reacted for two hours at 190° C. It was found that about 78.6 percent of the ketone had been converted to ar-dichloro-α-methylbenzyl alcohol. A small amount of rearrangement of the chlorine substituents had taken place.

EXAMPLE 14

Similarly, a mixture of 60 ml. of isopropyl alcohol, 20 g. of p-chlorobutyrophenone, and 3 g. of the alumina used in Examples 12 and 13 was heated at 200° C. for 2 hours. About 40 percent of the starting ketone was converted to p-chloro-α-propylbenzyl alcohol with the rest of the ketone substantially unreacted.

EXAMPLE 15

As in Example 14, a mixture of 60 ml. of isopropyl alcohol, 10 ml. of 2-octanone, and 3 g. of the same alumina was reacted under the same conditions to obtain a 21.5 percent conversion of the ketone to 2-octanol.

EXAMPLE 16

As described in Examples 12–15, a mixture of 60 ml. of isopropyl alcohol, 20 ml. of ar-tert-butylacetophenone (consisting essentially of 95 percent of the para isomer and 5 percent of the meta isomer), and 3 g. of the same alumina was heated 2 hours at 200° C. to obtain a conversion of about 32 percent of the ketone to the corresponding ar-tert-butyl-α-methylbenzyl alcohols.

I claim:

1. In the process for conducting a liquid phase exchange reaction between a secondary alcohol and a ketone in the presence of an exchange catalyst at about 150–300° C. and at least the autogenous pressure of the system wherein the alcohol has the formula

and the ketone has the formula

where each R taken separately and each $R_1$ taken separately is alkyl or phenyl, either unsubstituted or substituted with groups inert under the reaction conditions, said groups being halo, amino, cyano, alkyl of 1–6 carbon atoms, or phenyl and where the two R groups or the two $R_1$ groups are taken together, the alcohol or the ketone respectively is a cycloalkanol or a cycloalkanone, each of 5–12 carbon atoms, the improvement of using activated alumina as the catalyst.

2. A process as defined in claim 1 wherein a molar excess of alcohol is used to conduct the reaction.

3. A process as defined in claim 1 wherein the alcohol is a lower alkanol, and the ketone is an alkyl phenyl ketone where the alkyl group has up to about six carbon atoms.

4. A process as defined in claim 3 wherein the alumina is a neutral or basic activated alumina.

5. A process as defined in claim 4 wherein the temperature is between about 175 and 250° C. and the molar ratio of alcohol to ketone is at least 3 to 1.

6. A process as defined in claim 5 wherein the ketone is ar-chloroacetophenone.

7. A process as defined in claim 6 wherein the temperature is 200–225° C.

8. A process as defined in claim 5 wherein the ketone is ar-tert-butylacetophenone.

9. The process of claim 8 wherein the ketone is p-tert-butylacetophenone.

10. A process as defined in claim 5 wherein the ketone is ar-dichloroacetophenone.

11. The process of claim 9 wherein the ketone is 2′,5′-dichloroacetophenone.

References Cited

FOREIGN PATENTS 619,014  3/1949  Great Britain _____ 260—638B

DANIEL D. HORWITZ, Primary Examiner

U.S. Cl. X.R.

260—465, 465.6 575, 578, 584, 586, 590, 591, 593, 617, 618, 638; 252—463